(12) United States Patent
Levesque et al.

(10) Patent No.: US 7,895,007 B2
(45) Date of Patent: Feb. 22, 2011

(54) DIGITAL SIGNAL PROCESSING IN OPTICAL SYSTEMS USED FOR RANGING APPLICATIONS

(75) Inventors: Marc Levesque, Saint-Augustin de Desmaures (CA); François Babin, Quebec (CA); Daniel Cantin, Quebec (CA)

(73) Assignee: Institut National D'Optique, Sainte-Foy, Quebec (CA)

( * ) Notice: Subject to any disclaimer, the term of this patent is extended or adjusted under 35 U.S.C. 154(b) by 0 days.

(21) Appl. No.: 12/604,824

(22) Filed: Oct. 23, 2009

(65) Prior Publication Data

US 2010/0039637 A1    Feb. 18, 2010

Related U.S. Application Data

(62) Division of application No. 11/936,502, filed on Nov. 7, 2007, now Pat. No. 7,640,122.

(51) Int. Cl.
*G01R 13/00* (2006.01)
(52) U.S. Cl. ............... 702/69; 250/559.38; 702/71; 702/158
(58) Field of Classification Search ............. 702/66–76, 702/158, 176; 250/559.38; 356/5.03, 5.08; 367/99; 342/109, 175
See application file for complete search history.

(56) References Cited

U.S. PATENT DOCUMENTS 5,179,286 A    1/1993    Akasu 5,357,331 A    10/1994   Flockencier
5,760,887 A    6/1998    Fink et al.
5,805,468 A    9/1998    Blöhbaum (Continued)

FOREIGN PATENT DOCUMENTS

EP    0 312 524    8/1988

OTHER PUBLICATIONS

Amann et al. "Laser ranging: a critical review of usual techniques for distance measurement." *Optical Engineering*. vol. 40, pp. 10-19 (2001).

(Continued)

*Primary Examiner*—John H Le
(74) *Attorney, Agent, or Firm*—Merchant & Gould P.C.

(57) ABSTRACT

Methods and apparatuses for reducing the response time along with increasing the probability of ranging of optical rangefinders that digitize the signal waveforms obtained from the pulse echoes returned from various types of objects to be ranged, the pulse echoes being too weak to allow successful ranging from a single waveform or the objects being possibly in motion during the capture of the pulse echoes. In a first embodiment of the invention, the response time at close range of a digital optical rangefinder is reduced by using a signal averaging process wherein the number of data to be averaged varies with the distance according to a predetermined function. In a second embodiment of the invention, the probability of ranging objects in motion along the line of sight of a digital optical rangefinder is increased and the object velocity measured by performing a range shift of each acquired signal waveform prior to averaging. In a third embodiment of the invention, the signal waveforms acquired in the line of sight of a digital optical rangefinder are scanned over a predetermined zone and range shifted and averaged to allow for early detection and ranging of objects that enter in the zone.

14 Claims, 11 Drawing Sheets

U.S. PATENT DOCUMENTS

| | | |
|---|---|---|
| 6,100,539 A | 8/2000 | Blümcke et al. |
| 6,259,515 B1 | 7/2001 | Benz et al. |
| 6,516,286 B1 | 2/2003 | Aebischer et al. |
| 6,753,950 B2 | 6/2004 | Morcom |
| 6,836,317 B1 | 12/2004 | Perger |
| 6,987,707 B2 | 1/2006 | Feintuch et al. |

OTHER PUBLICATIONS

R.W. Byren "Laser rangefinders." *The Infrared and Electro-optical Systems Handbook vol. 6: Active Electro-optical Systems*. C.S. Fox, Editor, SPIE Press, Bellingham, WA, 1993. Chapter 2.

Thayer et al. "Rayleigh lidar system for middle atmosphere research in the arctic." *Optical Engineering*. vol. 36, pp. 2045-2061 1997.

DIGITAL SIGNAL PROCESSING IN OPTICAL SYSTEMS USED FOR RANGING APPLICATIONS

FIELD OF THE INVENTION

This invention generally relates to methods for improving the performance of an optical rangefinder used for measuring the distance to a moving object, and more particularly to methods for increasing the signal to noise ratio along with obtaining shorter response times for a time-of-flight rangefinder through digital processing of the received signal waveforms.

DESCRIPTION OF THE PRIOR ART

Lidar Systems

Radiation with wavelength in the optical region of the electromagnetic spectrum i.e., from the ultraviolet up to the infrared, can interact with matter in various states through mechanisms such as optical absorption and scattering. Early after the advent of the first lasers, it was recognized that these novel sources of coherent optical radiation could be used for sensing solid objects, particulate matter, aerosols, and even molecular species located at long distances. Remote sensing applications emerged owing to some distinctive features of laser sources. For example, several types of laser sources emit optical pulses carrying high energy that can propagate in the atmosphere in the form of a slowly-diverging optical beam. Similarly to the radio and microwave radiation sources used in common radar instruments, systems that employ light sources for remote sensing applications are generally known as lidar systems, or simply lidars, which is the acronym for Light Detection And Ranging.

Lidars for Rangefinding Applications

Nowadays, the most frequently encountered application domain of lidars is undoubtedly the non-contact measurement of the distance that separates a remote object from the lidar. This application domain is usually denoted as optical ranging, and it encompasses the measurement of the distances of objects of various types. Hence, the object to be ranged can be for example a solid object like a moving vehicle in traffic control and collision-avoidance applications, a cloud of aerosol droplets in the monitoring of pesticide aerial drifts in agricultural fields, and liquids in non-contact level sensing of the content of tanks. Lidar devices intended for ranging of solid objects are commonly referred to as optical rangefinders. Most optical rangefinders designed for measuring distances of a few meters up to several kilometers rely on the pulsed time-of-flight (TOF) principle, also known in the art as the pulse echo principle or pulse transit time principle. This principle requires that the light source integrated in the rangefinder emits optical pulses of short duration, typically in the ns (nanosecond, 1 ns=$10^{-9}$ s) range, either in single-shot regime or in the form of a pulse train of limited duration. The TOF principle consists essentially in measuring the time it takes an optical pulse to travel from the rangefinder up to a remote object, and then to return back to the instrument. The range R of the targeted object is deduced from the measured full round-trip time T of the optical pulse using the simple relation:

$$R = \frac{cT}{2n}, \quad (1)$$

where c is the speed of light in vacuum, which scales to roughly $3 \times 10^8$ m/s, and n denotes the refractive index of the medium in which the optical pulse propagates. Methods for optical ranging are not limited to the pulsed TOF technique. Methods such as optical triangulation, interferometric phase-shift range finding, and frequency-modulated continuous-wave (FMCW) range finding, just to name of few, exist as well. The review paper of M.-C. Amann et al. ("Laser ranging: a critical review of usual techniques for distance measurement", *Optical Engineering* vol. 40, pp. 10-19, January 2001) discusses these techniques in greater details.

The round-trip time T of any given optical pulse emitted from a majority of TOF rangefinders is measured by initiating an electronic counter or a voltage ramp simultaneously with the launch of the pulse. The counter or voltage ramp is then stopped as soon as the receiver module of the rangefinder detects the pulse echo. A targeted object is successfully ranged when the amplitude of the pulse echo exceeds a preset threshold voltage, this comparison being performed by an analog voltage comparator. The threshold voltage must be set high enough to avoid false alarms triggered by noise peaks that corrupt the voltage signal at the output of the receiver module. On the other hand, the threshold voltage must be set low enough to provide sufficient sensitivity to allow ranging on objects that return weak pulse echoes. Upon successful detection of a pulse echo, the range to the object is determined from the output of the range counter or voltage ramp, using Eq. (1) shown above. The measurement data is finally displayed to the user.

The above description holds for instruments in which the received pulse signals are processed by fully analog electronics. This design choice contributed heavily to the development of robust, compact, and low-cost optical rangefinders with low power consumption, paving the way for high volume manufacturing of optical rangefinder products for the consumer market. These products are intended for ranging applications of various types, but for which the ranges to be measured do not exceed about 1000 m in good atmospheric visibility conditions and with cooperative (highly reflecting) objects to be ranged. Unfortunately, the relative simplicity of the analog electronic designs is obtained at the expense of performance and flexibility. For instance, it can happen that the optical pulses radiated by a rangefinder hit more than a single object along their travel to the object to be ranged. In this case the return signal waveform presents a succession of more or less separated peaks having different amplitudes. This situation can be tackled with varying success by rangefinder devices that offer both first-reply and last-reply modes, in which the range counter is stopped by triggering only on the first pulse and on the last pulse detected in the signal waveform, respectively. For example, the last-reply mode can be selected to prevent from ranging on nearby aerosols (i.e., fog, smoke clouds) present along the optical beam path. In turn, the first-reply mode can help when significant background clutter is present. Despite these useful add-ons, most analog rangefinders limit their output to the raw display of the measured range value, without any further information about the specific temporal shape of the received signal waveforms. As a consequence, even an experienced user cannot always be aware of false range measurement events caused by the presence of clutter along the line of sight of the device, by the pointing jitter of the device, or by adverse weather conditions that cause inadvertent ranging events at ranges closer than the aimed object.

Optical Rangefinders with Digital Processing of the Received Signal Waveforms

The implementation of digital signal processing in optical rangefinder instruments is very appealing for getting around several limitations of dedicated analog processing. Hence, by routing the filtered analog signal waveforms from the optical receiver module to a fast analog-to-digital (A/D) converter, the resulting digitized signal waveforms can then be processed by a microprocessor. An endless variety of software codes can be run, thus enabling new ways for improving some performance figures of the rangefinder or for implementing additional features in a cost-effective manner. The primary limitations of digital signal processing now come from the desired maximum response time of the instrument.

Even limited forms of digital signal processing can impact on critical performance metrics of optical rangefinders, such as the maximum range that can be successfully measured in specific environmental conditions. One of the simplest operations for extending the maximum range specification is the averaging (or accumulation) of a set of digitized signal waveforms obtained from the signal echoes associated with an emitted optical pulse train. Signal averaging is well known in the art as an efficient way to increase the signal to noise ratio (SNR) of waveforms corrupted with white noise. The SNR is defined here as the ratio of the peak signal amplitude to the root-mean-square (rms) noise amplitude of a waveform. It can be shown that when both conditions of correlated useful signals and uncorrelated noise are fulfilled, the net SNR resulting from the average of N independent waveforms is given by $SNR_{NET}=(N)^{1/2}SNR_W$, where $SNR_W$ stands for the signal to noise ratio of a single 5 waveform. For instance, a tenfold SNR improvement results when averaging a set of 100 independent signal waveforms acquired in similar (stationary) conditions. Signal averaging then appears as an attractive way to enable ranging of objects located at farther distances without the need for upgrading the rangefinder hardware. This is due to the fact that the SNR performance figure of common optical rangefinders and of other types of lidar systems decreases steadily with the range to the object. As a consequence, the minimum SNR value that allows reliable detection of typical object signatures embedded in a noisy signal waveform dictates the maximum range that can be measured.

The light sources integrated in the optical emitter module of most rangefinders designed for short to medium ranging can emit optical pulse trains at pulse repetition frequencies (PRF) exceeding several tens of kHz. These high PRFs then enable averaging of large sets of independent return signal waveforms while providing instrument response times that are suitable for many applications. In addition, using signal averaging as a way to enhance the SNR performance figure may help in keeping the optical irradiance level of each pulse lower than the applicable Maximum Permissible Exposure (MPE) as prescribed in laser safety standards such as the ANSI Z136.1-2000 *American National Standard for Safe Use of Lasers*. As a result, farther objects can be successfully ranged while maintaining the optical pulse irradiance well below the exposure level at which ocular damages due to direct intrabeam viewing could take place. Rangefinders and laser radar instruments that employ averaging of the digitized return signal waveforms are taught for example in European Patent No. EP0312524 to Gaechter, in U.S. Pat. No. 5,179,286 to Akasu, U.S. Pat. No. 5,357,331 to Flockencier, U.S. Pat. No. 5,760,887 to Fink et al., U.S. Pat. No. 6,259,515 to Benz et al., and U.S. Pat. No. 6,836,317 to Perger.

Limitations of the Standard Signal Averaging Technique

In principle, one could obtain output waveforms having the desired SNR by averaging a sufficient number of raw signal waveforms. The time delay required to collect the whole waveform set, denoted as the integration time, depends primarily on the PRF of the optical emitter module of the rangefinder. In turn, the integration time plays a major role in setting the minimum response time of the rangefinder instrument. Fast response times are critical in some optical ranging applications. A good example consists of collision avoidance systems embarked in vehicles, for which the delay in triggering alarms must be minimized when objects are located at close distances in front of a moving vehicle. Unfortunately, the response time is generally established from a fixed value of the integration time, this latter value being generally determined by the need to successfully range objects located at the maximum distance to be covered by the instrument. As a result, the implementation of a standard signal averaging process may lead to an instrument response that would be too slow for some applications where nearby objects must be detected and ranged very quickly. In fact, the difficulty originates from the integration of a fixed number of raw signal waveforms, which does not really take advantage of the important variations of the SNR response of typical optical rangefinders as a function of the range to the object.

The standard averaging technique performs at its best when carried out on waveforms corrupted with uncorrelated random noise and in which the characteristics of the object signature to be detected do not change appreciably over the whole set of collected waveforms. Unfortunately, these requirements can be difficult to satisfy in practical situations, so that the SNR improvement resulting from standard signal averaging may be disappointing. A typical example occurs when one attempts to range an object that moves along the line of sight of the rangefinder during the integration time. In this case, the signal averaging process would fail to discriminate the object signature against noise since the position of the corresponding peak signal amplitude will move from waveform to waveform. Consequently, the averaged output waveform would comprise a composite signal formed by the spreading of the intrinsic object signature over the range interval covered by the object during its motion. The averaging operation would not succeed in increasing the amplitude of the object signature, so that the output signal would not really discriminate against the noise background.

Finally, in some applications the number of signal waveforms to be averaged needs to be chosen with care when an object having time-varying characteristics must be ranged by integrating the waveforms during a non-negligible period of time. Hence, it is well known in the art that averaging a large number N of waveforms will wash out the signal features that change significantly over time scales shorter than the integration time. This situation occurs for instance when using lidar systems for the detection and ranging of remote aerosols and molecules, whose optical return characteristics are unstable and evolve rapidly with time. See for example J. P. Thayer et al., "Rayleigh lidar system for middle atmosphere research in the arctic", *Optical Engineering* vol. 36, pp. 2045-2061, (1997). Excessive averaging of the return signal waveforms may also hide critical information about an object that is ranged under degraded visibility conditions, such as to infer whether the object is a living body (with detectable movement) or a lifeless object (without any detectable movement).

Digital Correlation of the Signal Waveforms

In addition to the averaging of the received signal waveforms as discussed in the preceding paragraphs, other digital processing techniques can be implemented in rangefinder instruments as well. For example, a technique well known in the art for increasing the range resolution of optical rangefinders consists in numerically correlating the received signal waveforms with a reference profile or function. This reference function can be for example a digitized version of the instrument response to a solid object, this response being permanently stored in memory. U.S. Pat. No. 5,805,468 to Blöhbaum, U.S. Pat. No. 6,100,539 to Blümcke et al, U.S. Pat. No. 6,259,515 to Benz et al., U.S. Pat. No. 6,516,286 to Aebischer et al., and U.S. Pat. No. 6,753,950 to Morcom disclose laser rangefinding apparatuses or methods that implement digital correlation of the received signal waveforms. The range associated to the peak signal return within the received waveforms can be inferred from the position at which the result of the correlation process gets its peak value. As mentioned in U.S. Pat. No. 6,259,515 to Benz et al., this method for signal processing gives enhanced range resolution when the reference correlation function is sampled at a frequency higher than that used for digitizing the signal waveforms. In many cases, the digital correlation is performed on a processed waveform obtained by previously averaging a set of raw signal waveforms, so that the difficulties discussed earlier about the standard signal averaging process still remain.

In view of the prior art recited above and of the various problems, challenges, and limitations reported when implementing, in optical rangefinders, standard methods for processing the digitized return signal waveforms, there is a need for developing new methods that can better account for the characteristics of targeted objects that return very weak pulse echoes while their relative position and/or optical reflection properties may vary during the integration time.

SUMMARY OF THE INVENTION

It is therefore a first object of the present invention to provide a method for implementing more efficient digital processing of optical rangefinder data wherein the level of averaging of a set of received signal waveforms accounts for the range-dependent signal-to-noise characteristics of the instrument while providing response times suited to the range to the targeted object.

Another object of the present invention is to provide a method for digital processing of optical rangefinder data in which the SNR-enhancing capability of standard signal averaging techniques is maintained when ranging objects that move over significant distances during the acquisition of the return signal waveforms.

Yet another object of the present invention is to provide a method for digital processing of optical rangefinder data in which the SNR-enhancing capability of signal averaging techniques is maintained while allowing the measurement of the relative velocity of a targeted object along the line of sight of the rangefinder.

Another object of the present invention is to provide a method for digital processing of the data generated by an optical rangefinder whose line of sight is scanned over a predetermined angular interval, and in which the SNR-enhancing capability of standard signal averaging techniques is maintained when ranging objects that move along any direction when located in the region covered by the scanned lines of sight.

Yet another object of the present invention is to provide a method for digital processing of the data generated by an optical rangefinder whose line of sight is scanned over a predetermined angular interval, and which enables the measurement in real time of the relative velocity and travel direction of an object in motion as well as the prediction of its trajectory.

These and other objects of the invention will be more fully appreciated by reference to the following summary of the invention and the description of the preferred embodiments that follows, bearing in mind that various aspects of the present invention respond to one or more of the above objects and that not all aspects necessarily meet all objects simultaneously.

According to various aspects of the present invention, digital processing methods are disclosed for reducing the response time along with increasing the probability of ranging (closely related to the signal to noise ratio) of optical rangefinders that digitize the signal waveforms obtained from the pulse echoes returned from various types of objects to be ranged. The methods aim at improving the performance of optical digital rangefinders, particularly for situations where the pulse echoes returned from an object are too weak to allow successful ranging from a single waveform. Likewise, the methods alleviate an important limitation of standard signal averaging techniques by allowing the ranging of objects in motion during the capture of the pulse echoes. In one aspect of the invention, the response time at close ranges of a digital optical rangefinder is reduced by using a signal averaging process in which the quantity of sampled data to be averaged varies with the distance according to a predetermined function. The function generally increases monotonically with the range in order to balance the well-known reduction of the signal amplitude returned by an object as it gets farther from the rangefinder.

In another aspect of the invention, the probability of ranging objects that move along the line of sight of a digital optical rangefinder is increased by performing range shift operations on a set of signal waveforms prior to averaging them. The range shifts to be applied increase linearly with the specific relative time at which each individual waveform has been acquired. The incremental range shift value gets optimum when the shifts of the object signature present in a set of signal waveforms are cancelled out. Averaging the range-shifted waveforms then allows for the recovery of nearly the same object signature as would be obtained if the object had been at rest with respect to the rangefinder. The signal to noise ratio of the resulting signal waveform can then be increased by a factor given by the square root of the number of raw signal waveforms that are processed according to the method. The relative velocity of the object is readily deduced from the optimum range shift parameter and the time delay that separates two consecutive signal waveform acquisitions.

In yet another aspect of the invention, the signal waveforms acquired as the line of sight of a digital optical rangefinder scans over an angular interval are range shifted and then averaged to allow for early detection and ranging of objects that enter in the region covered by the scanning rangefinder. The method also enables the measurement of the motion parameters of the object from the search for the optimum combination of parameters that maximize the amplitude of the object signature present in the output signal waveforms. The trajectory of an object in regular motion can then be easily predicted from this optimum combination of parameters. In addition, objects subjected to changes in their motion parameters can be ranged in real time by processing the signal waveforms acquired for a series of limited angular intervals within the whole angular interval covered by the digital optical rangefinder.

BRIEF DESCRIPTION OF THE DRAWINGS

The invention will be further appreciated by reference to the detailed descriptions of the preferred embodiments in conjunction with the drawings thereof, in which.

DETAILED DESCRIPTION OF THE PREFERRED EMBODIMENTS

General Overview of a Digital Rangefinder

Figure 1:
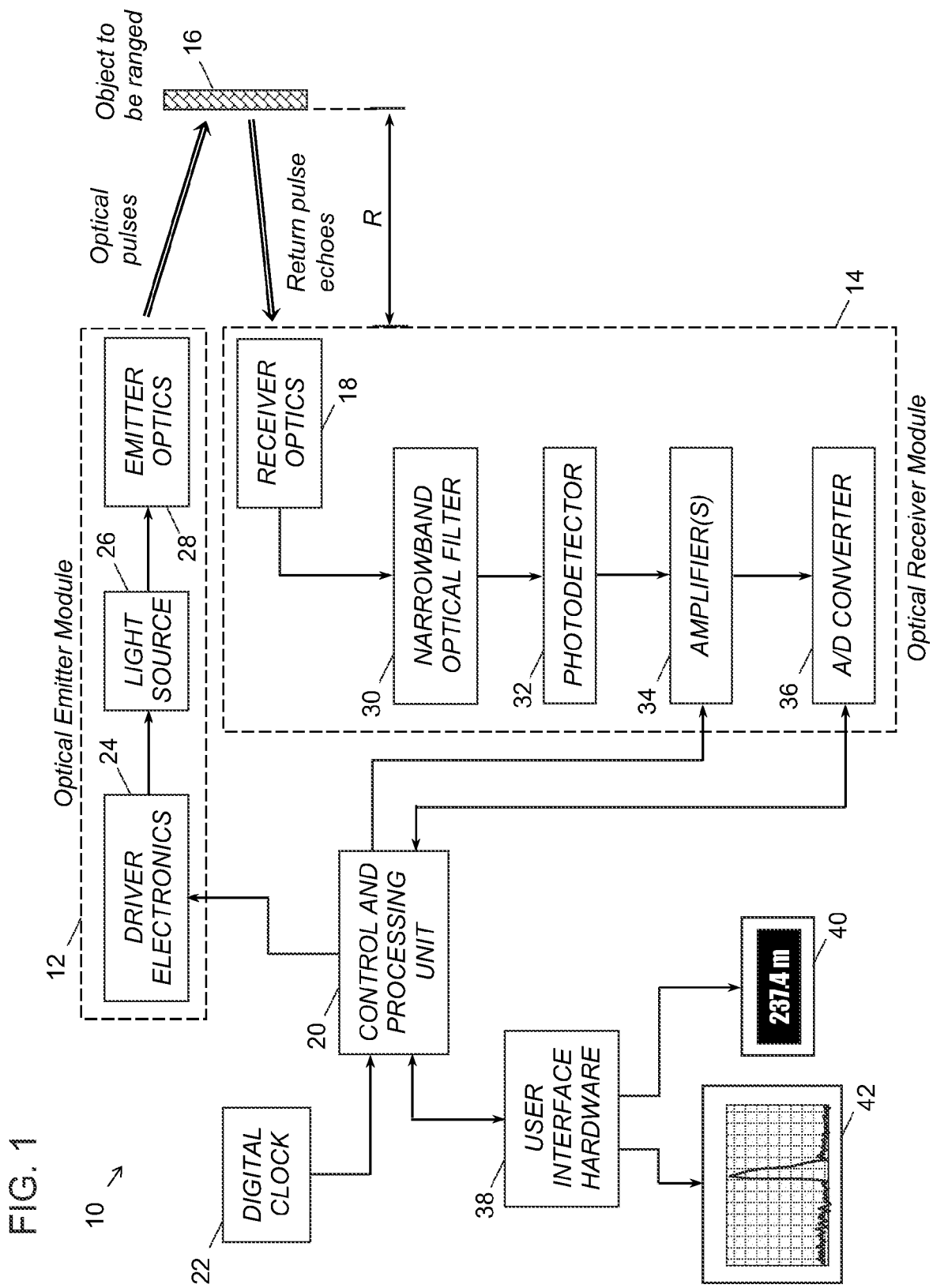
FIG. 1 is a schematic block diagram of an optical rangefinder with digitization and processing of the returned signal waveforms.

The various embodiments of the invention described below are intended for implementation in an optical rangefinding apparatus with digitization of the received signal waveforms. The basic elements of a digital rangefinder 10 can be better appreciated by referring to the schematic block diagram depicted in FIG. 1. The instrument comprises an optical emitter module 12 for emission of a train of optical pulses having predetermined characteristics, and an optical receiver module 14 for the capture and pre-processing of the return signal waveforms. The signal waveforms originate from the fraction of the emitted optical pulse energy that is reflected or back-scattered by the object 16 located at range R from the rangefinder 10, and which is in the field of view of the receiver optics 18. A control and processing unit 20 controls the operation of both optical emitter 12 and optical receiver 14 modules. Among other things, the control process synchronizes the emission of each individual optical pulse with the start of the sampling and A/D data conversion of the return signal collected by the receiver module 14. A digital clock 22 generates clock signals for the control and processing unit 20 to ensure precise timing of both modules.

Optical Emitter Module

Upon reception of a trigger signal from the control and processing unit 20, the driver electronics 24 generates an electrical current pulse whose duration lies in the ns range. The current pulse is then routed to the light source 26 for emission of an optical pulse. The light source 26 is generally a laser, but other types of optical sources, such as light-emitting diodes (LEDs), can be envisioned without departing from the scope of the present invention. The use of semiconductor laser diode assemblies now prevails in optical rangefinders. The laser diode assembly may comprise a single-emitter laser diode, a multiple-emitter laser diode, or even a two-dimensional stacked array of multiple-emitter laser diodes. The specific type of light source integrated in a rangefinder 10 depends, inter alia, on factors such as the peak optical output power required for successful ranging at the desired maximum range, the emission wavelength, and the device cost. Light sources such as fiber lasers, microchip lasers and even solid-state lasers find their way in rangefinding applications, particularly when no laser diode source exists at the desired emission wavelength. The optical pulses pass through the emitter optics 28 before leaving the optical emitter module 12. The emitter optics 28 shapes the optical pulses in the form of a beam having the desired propagation characteristics. The primary optical beam characteristics are the beam divergence, the transverse size of the beam irradiance profile at the exit aperture of the emitter module 12 (for eye safety concerns), and the spatial beam quality. The emitter 28 and receiver optics 18 are generally boresighted so as the optical beam path and the field of view of the receiver module 14 overlap over a predetermined range interval.

Optical Receiver Module

The return optical signals collected by the receiver optics 18 pass through a narrowband optical filter 30 for removal of the parasitic background light before impinging on the sensitive surface of a photodetector 32. The photodetector 32 is generally an avalanche or PIN photodiode with material composition suited to the wavelength of the optical pulses. The pre-amplified voltage signal from the photodetector 32 is then fed to an amplifier 34. The amplifier circuit may comprise a matched filter to limit the electrical bandwidth of the optical receiver module 14. The control and processing unit 20 controls the amplifier gain to ensure that the signal amplitude fits within the input voltage dynamic range of the A/D converter 36. It is known in the art that other amplifier configurations could be used as well, such as a logarithmic amplifier or a set of amplifiers mounted in parallel, each amplifier having a fixed gain. The A/D converter 36 digitizes the input voltage signals at a sampling rate of typically several tens of MS/s (mega-samples per second). The time period between two consecutive digital sampling operations defines the extent of the so-called range bins of the instrument 10, when expressed in units of distance.

Finally, the user operates the rangefinder 10 and receives data from it through the user interface hardware 38. For instance, the measured range to the targeted object 16 can be simply displayed in digital form on a liquid-crystal or plasma visual display 40. In more sophisticated instruments, the full temporal/spatial shapes of the processed signal waveforms can be graphically displayed on a monitor screen 42 and then stored in memory for later use or processing.

Standard Averaging of Digitized Signal Waveforms

Figure 2:
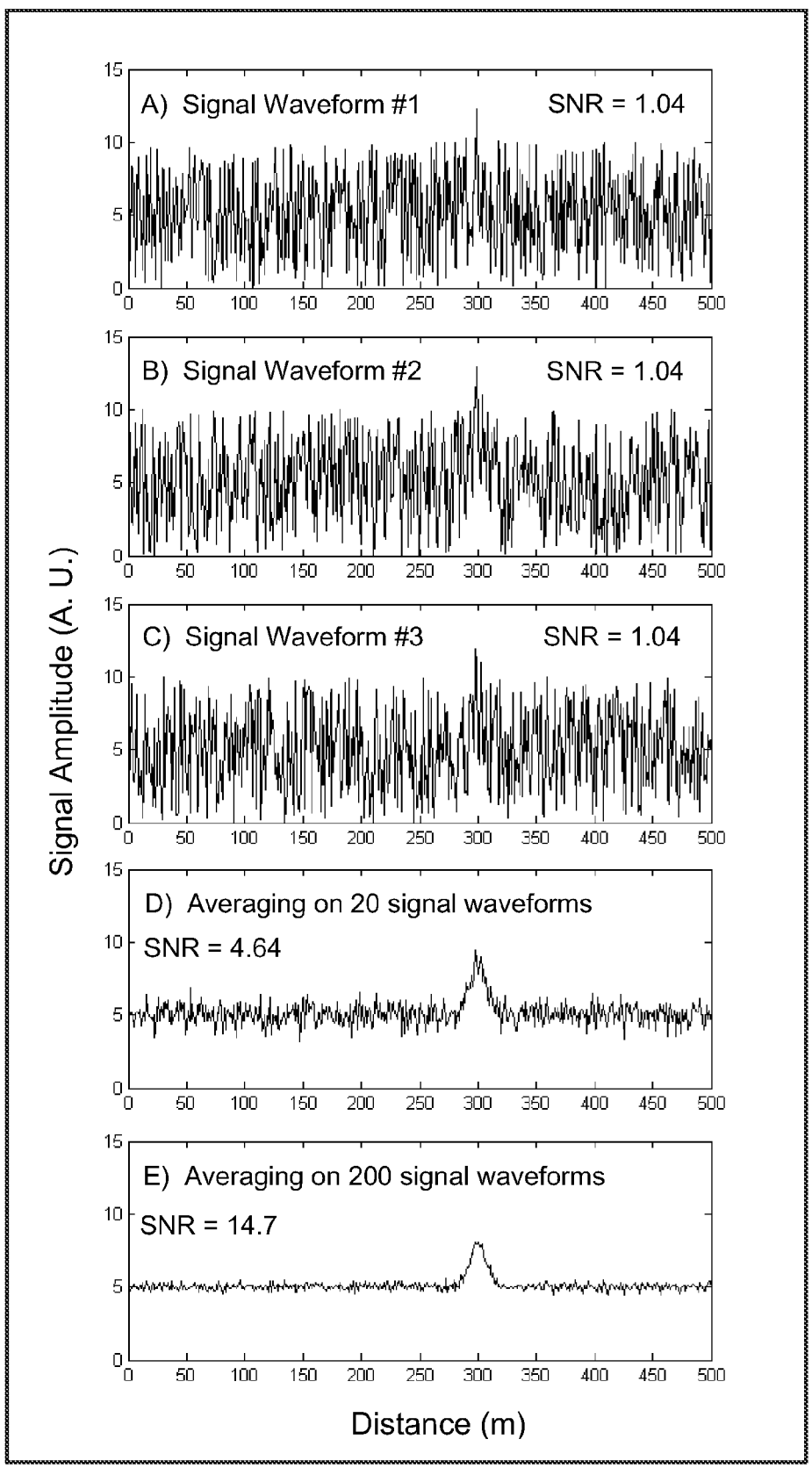
FIGS. 2A to 2E (Prior Art) present a set of rangefinder signal waveforms for the purpose of illustrating the effect of the standard signal averaging technique for improving the noise figure of the processed output waveforms when ranging to an object at rest.

FIGS. 2A to 2C show examples of three raw signal waveforms typical of those that can be received and processed by digital rangefinders. Each waveform comprises a pulse signal indicative of the presence of a reflecting object (the object signature) located at a distance of 300 m from the rangefinder. The object signature has a Gaussian-shaped profile with peak amplitude of 3. The signature is hardly detected from a visual inspection of the waveforms because it is embedded in a random noise background having peak-to-peak amplitude of 10 (rms noise level≈2.89) in the units employed for the vertical scale of the figures. The waveforms then have a mean SNR of 1.04. The mean level of the noise component has been up-shifted by an offset of 5 in order to better appreciate the total noise amplitude swing in the figures. Note that the noise is uncorrelated from waveform to waveform. The range bins are 1-m wide, meaning that the input signal waveforms have been sampled at a rate of 150 MS/s. The waveforms displayed in the figure cover the range interval from 0 m to 500 m, so they comprise a total of 500 sampled data points. The processed signal waveforms obtained by simple averaging of limited sets of 20 and 200 signal waveforms are illustrated in FIGS. 2D and 2E, respectively. In this idealized example, the object signature clearly discriminates against noise even when averaging only a few signal waveforms. The stationary character of the object signature along with the perfectly uncorrelated noise components lead to processed waveforms having SNR values that vary according to the simple law $SNR_{NET}=(N)^{1/2}SNR_W$ discussed earlier.

Description of a First Preferred Embodiment of the Invention

Range-Dependent Averaging to Improve the Response Time of a Rangefinder

As discussed earlier, the response time of an optical rangefinder that processes the digitized signal waveforms may appear as unacceptably slow when the typical noise figure of the received waveforms calls for extensive averaging. The standard averaging operation discussed up to now does not account for the fact that the SNR associated with an object signature may vary significantly with the range to the object. As discussed in Section 2.4 of Byren's textbook (see R. W. Byren, "Laser rangefinders", Chapt. 2 of *The Infrared and Electro-optical Systems Handbook* Vol. 6: *Active Electro-optical Systems*, C. S. Fox, Editor, SPIE Press, Bellingham, Wash., 1993), the general range equation for optical rangefinders shows that the SNR varies as $1/R^2$ with the range R. This simple behavior holds for the common situation where the optical beam is fully intercepted by the targeted object. This simple behavior also assumes that the optical beam propagates over a short distance under good visibility conditions so that the optical atmospheric extinction remains negligible. The averaging level N, defined here as the number of raw signal waveforms to be averaged, is usually set in order to get the required SNR for objects having specific reflecting properties while being located at the maximum range to be covered by the rangefinder. As a consequence, the standard averaging process severely limits the instrument response time, particularly when one wants to range objects located at close range.

One aspect of the present invention is thus to provide a method that optimizes the response time of a digital rangefinder for objects that could be located at various distances. The method takes advantage of the dependency of the SNR response of the rangefinder upon the range R to the object. In its essence, the method consists in averaging previously acquired signal waveforms by using an averaging level N that is a function of the distance. N could vary in such a way that the data points sampled for the farther distances are more heavily averaged than those corresponding to shorter distances. As a result, the response time of the instrument would not be the same for all of the data points of the processed signal waveform since this response time is largely determined by the averaging operation. Enabling very fast response times, particularly for ranging objects located at short distances, is critical in applications such as collision-avoidance systems.

Using the symbol $N(R_i)$ to represent the range-dependent averaging level, the proposed averaging process can be described by the following expression:

$$S_{AVE}(R_i) = \frac{1}{N(R_i)} \sum_{j=1}^{N(R_i)} S_j(R_i) \quad i = 1, 2, 3 \ldots N_P \qquad (2)$$

where the symbol $\Sigma$ stands for the sum of a number $N(R_i)$ of digitized signal waveforms $S_j$. Each waveform $S_j$ can be thought of as a vector comprising $N_p$ sampled data points, each sample being related to its corresponding discrete range value $R_i$. In the above equation $S_{AVE}$ stands for the processed waveform vector obtained from the averaging operation.

Figure 3:
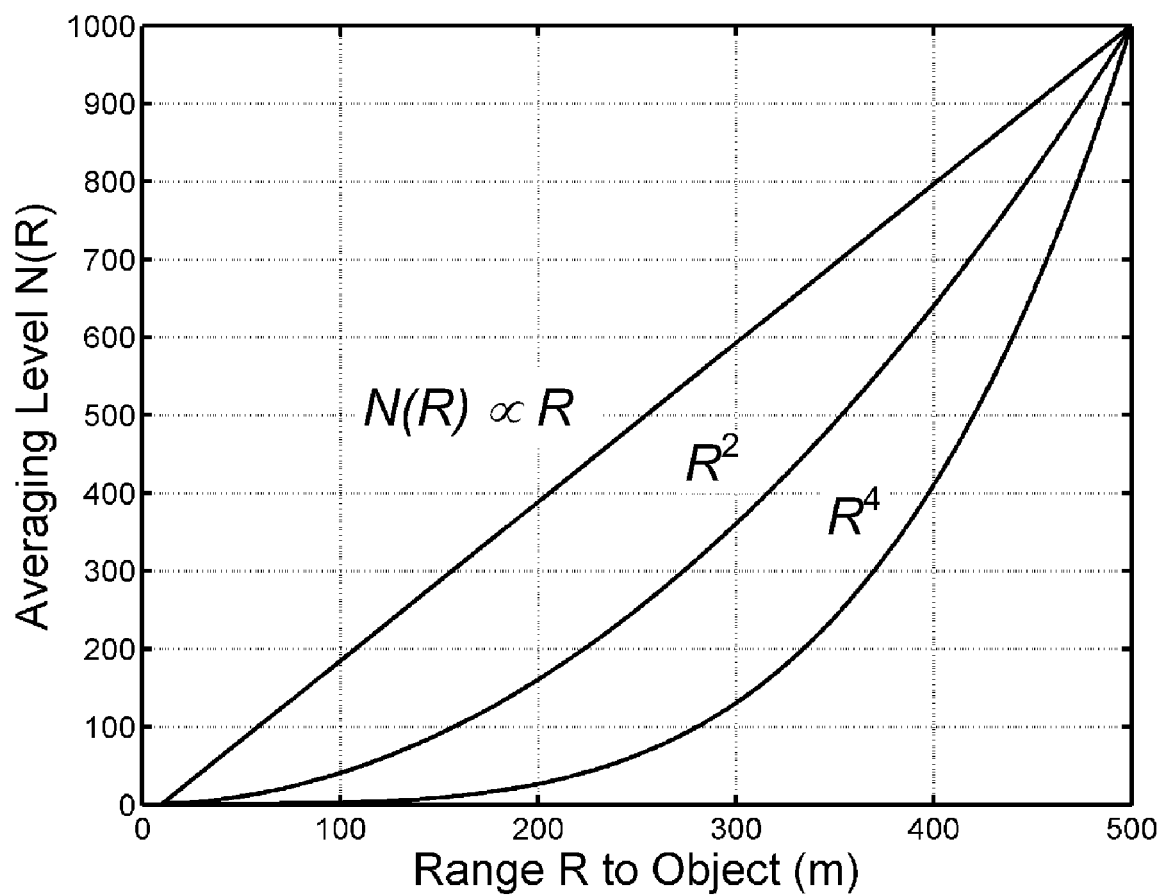
FIG. 3 illustrates three different functions describing how the averaging level parameter N can be varied with the range R to the object.

FIG. 3 illustrates three different functions that could be used to describe the variations of the averaging level N with the range to the object. The selected functions are given by simple polynomials of order one, two and four, respectively. In this example, each function increases monotonically with the range and it contains only two fitting parameters whose values are determined from the averaging levels desired at the closest range $N(R_1)$ and farthest range $N(R_{Np})$, respectively. For simplicity, the functions plotted in FIG. 3 all vary from $N(R_1)=1$ (i.e., no averaging) at the minimum range $R_1=10$ m, to $N(R_{Np})=1000$ at the maximum range $R_{Np}=500$ m. Note that the response time of the rangefinder would display nearly the same range dependency as the functions plotted in the figure. In the case where the instrument would display in real time the output signal waveform on a monitor screen, the update rate of the displayed data points would be very fast at short range while progressively getting slower with increasing range.

The specific functional forms for $N(R_i)$ shown in FIG. 3 have been chosen only for the purpose of better illustrating the concept of the invention. Several other range dependencies could be imagined for $N(R_i)$ without departing from the scope of the invention. Note that, for comparison, the standard averaging process is recovered simply by selecting a fixed value of N=1000 for the whole range interval.

Figure 4:
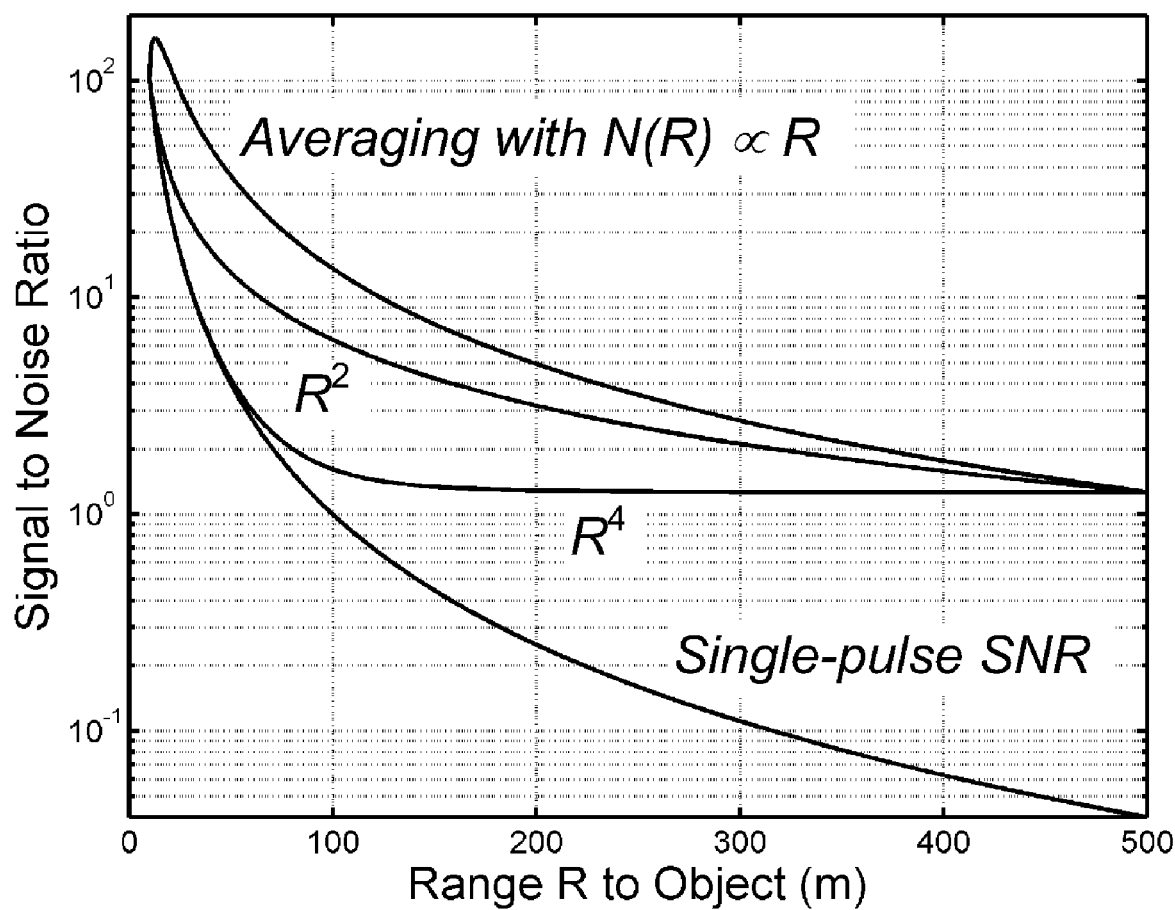
FIG. 4 illustrates the variations with the range R of the signal-to-noise ratio of a digital rangefinder output, obtained using the three averaging level parameters N shown in FIG. 3. The signal-to-noise ratio for a single pulse return is also plotted for comparison.

As noted earlier, under some conditions the net SNR resulting from the averaging of N independent signal waveforms can be increased by a multiplicative factor $(N)^{1/2}$ as compared to the SNR of a single waveform. Assuming an $1/R^2$ range dependency for the SNR as given by the general range equation for rangefinders, we have plotted in FIG. 4 the net SNR obtained when performing the range-dependent averaging operation with each of the three functions N(R) depicted in FIG. 3. The figure also shows the SNR related to a single waveform, whose value has been set to 100 at the range R=10 m, for convenience. In addition to the improved SNRs obtained at nearly all ranges, it is seen that the range-dependent averaging process results in significant reductions of the overall variations of the SNR over the retained range interval. The averaging process of the present invention then helps in flattening the SNR response of digital rangefinders. Of particular interest in FIG. 4 is the nearly flat SNR curve observed for ranges beyond approximately 150 m when using an averaging level having a fourth-order $R^4$ range dependency. This behavior comes simply from the fact that the square root of the $R^4$ range dependency cancels out the $1/R^2$ variation of the single-pulse SNR plotted in the figure. Devising an optical rangefinder with a flatter SNR response is particularly attractive for continuous ranging of an object whose distance from the instrument varies, without having to change repeatedly the instrument settings.

It is well known in the art that the range dependency of the raw SNR for real optical rangefinders may depart largely from the theoretical $1/R^2$ range equation. In addition, most of the time the real variations of the raw SNR with the range cannot be described in a satisfactory manner neither by using a simple polynomial expression such as those used in FIG. 3 nor by using more complex analytical functions. Fortunately, there is no need to rely solely on functions to describe the averaging level since very valuable information in this purpose can be inferred from a previous measurement of the raw SNR response $SNR_W(R)$ of the instrument. In effect, if one were interested to get a net SNR response $SNR_{NET}$ that would remain nearly constant for all ranges, the specific range dependency that would have to be selected for the averaging level would be given by the simple expression:

$$N(R) = \left(\frac{SNR_{NET}}{SNR_W(R)}\right)^2 \quad (3)$$

This expression is derived from the relation $SNR_{NET} = (N)^{1/2} SNR_W$ discussed earlier. This approach offers the advantage of providing an averaging level function suited specifically to the rangefinder instrument. Furthermore, the update rate of the output data is optimized for each range value since the averaging operation is carried out with the minimum number of raw signal data acquired at each range value to get the desired SNR. The function N(R) obtained from Eq. (3) could be stored in a look-up table and called by the digital processing unit when enabling a range-dependent averaging operation on a set of received signal waveforms.

Description of a Second Preferred Embodiment of the Invention

Averaging of Range-Shifted Signal Waveforms Returned from an Object in Motion

Figure 5:
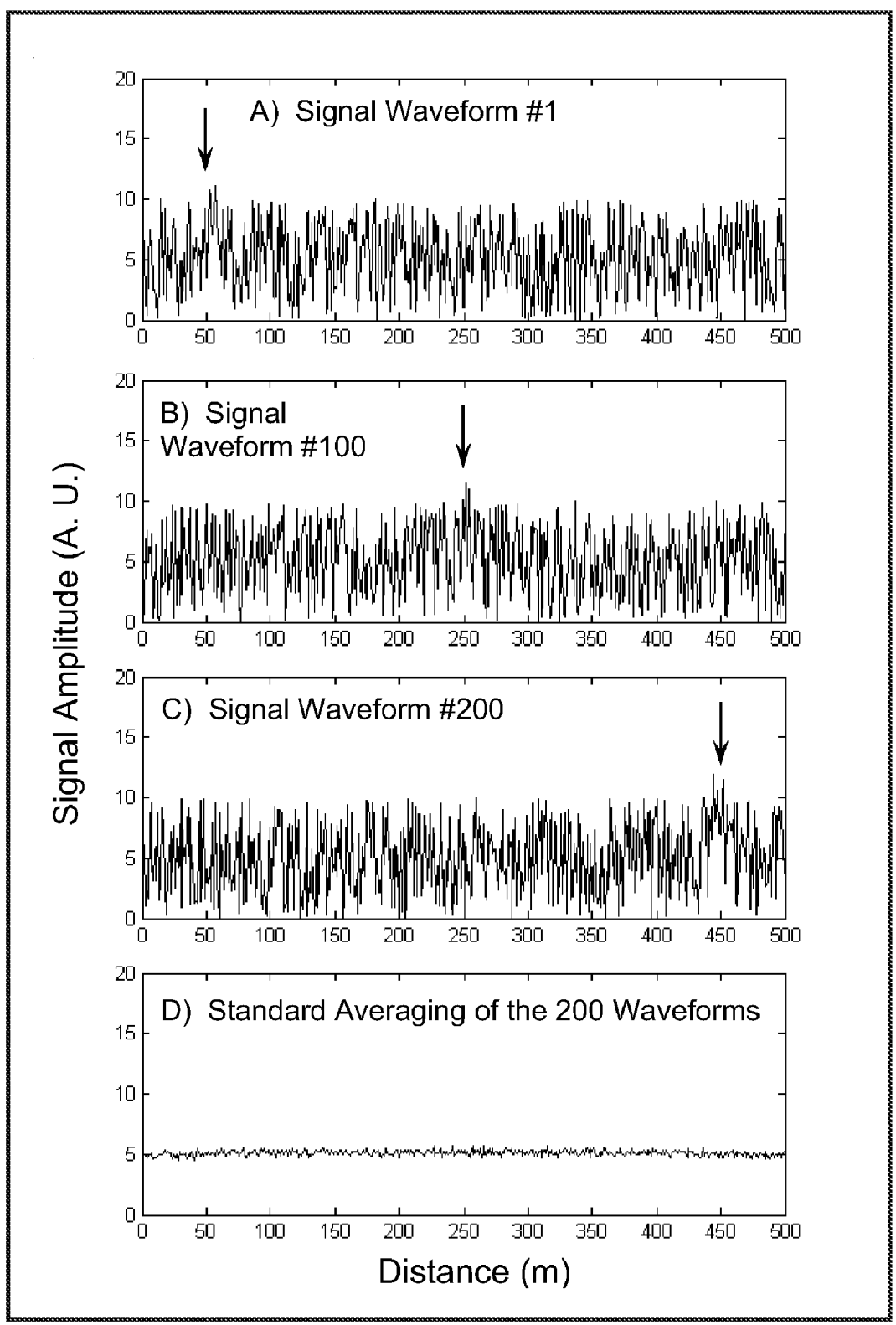
FIGS. 5A to 5D (Prior Art) show a set of rangefinder signal waveforms for the purpose of illustrating the effect of the standard signal averaging technique when applied to signal waveforms returned from a moving object.

As mentioned earlier, the successful detection of object signatures when using the noise reduction capability of a data averaging process calls for a set of signal waveforms corrupted with random, uncorrelated noise while the object signatures must be stationary. Unfortunately, the requirement for stationary signal features is clearly not fulfilled when trying to range an object that is moving over a sizable distance during the integration time. FIG. 5 clearly illustrates the basic limitation of the standard data averaging process when applied to such an event. For instance, FIGS. 5A to 5C show three individual raw signal waveforms that form part of a set of 200 waveforms generated by computer simulation of a ranging operation performed on a remote object in motion along the line of sight of the rangefinder. The arrow visible in each figure indicates the position of the object signature at the moment the waveform was acquired. In this specific example, the object was moving at a constant velocity from the initial distance R=50 m up to the final distance R=450 m during the integration time. The total 400-m move of the object then means that its signature is right-shifted by 2 m on consecutive waveforms. The selected object reflectivity lead to unprocessed waveforms with SNRs of nearly unity. As a consequence, the object signature cannot be easily detected from a simple visual inspection of the unprocessed waveforms. For simplicity, the response of the digital rangefinder was artificially kept uniform over the range interval covered by the horizontal axis of each figure, so that the peak signal amplitude (without noise) remains the same for the initial, intermediate, and final object positions shown in FIGS. 5A to 5C, respectively. However, it can be noted that this convenient assumption is not required for the operation of the method, and it does not limit its scope.

FIG. 5D shows the waveform obtained from the standard averaging of the 200 raw signal waveforms. This simple averaging process succeeded in reducing the rms noise level due to the fact that the noise components were fully random and uncorrelated. Unfortunately, one readily sees that the signal returned by the object has been totally washed out by the averaging operation. Because of the non-stationary character of the object signature, the rangefinder would inevitably fail at ranging the object in motion when attempting to compare the processed signal waveform shown in FIG. 5D with its detection threshold. Furthermore, it can be observed that the result would not have been significantly better by using raw waveforms having much higher SNRs. This is due to the fact that the effect of the averaging operation would be limited to spread the object signature over the range interval covered by the object during its motion, without any enhancement of its relative peak signal amplitude.

The signal waveforms generated when aiming a digital rangefinder at an object that moves at a constant velocity would display essentially the same object signature, but shifted by a distance $\Delta D$ from waveform to waveform. The shift $\Delta D$ is simply given by $\Delta D = V \times \tau$, where V is the object velocity along the line of sight of the rangefinder while $\tau$ stands for the time delay between the receptions of two consecutive signal waveforms. An objective of this second preferred embodiment of the present invention is to implement a dedicated averaging process that would allow for the recovery of nearly the same object signature as would be obtained with standard averaging of the signal waveforms returned by an identical object, but at rest. Stated otherwise, the SNR enhancement would not be affected by the fact that the ranged object is in motion. The principle of this second embodiment relies on the implementation of a controlled range shift of each individual waveform, prior to averaging. The shifts would be performed numerically in such a way that their collective effect would attempt at cancelling out the translation of the targeted object along the line of sight of the instrument. As noted earlier, the object velocity remains unknown at the time the raw waveforms are processed since the object signature is generally buried in noise. As a consequence, the exact amount of range shift to be applied for optimizing the recovery of the object signature is not known a priori. The procedure then consists in averaging the whole waveform set repeatedly, by using different values of the parameter that controls the range shift applied to each waveform. This parameter will be referred to as the range shift parameter (RSP). The optimum value of the RSP would then be inferred from the specific value it takes when the amplitude of the "reconstructed" object signature gets maximum. In other words, the optimum range shift would be obtained when RSP=−ΔD. The minus sign comes from the fact that a negative range shift must be applied to the waveforms when it is known that the targeted object moves away from the rangefinder, i.e., when the motion is characterized by a positive ΔD.

For any given value of the RSP, the elements of the waveform vector $S_{RSP}$ constructed by averaging a range-shifted waveform set read as:

$$S_{RSP}(R_i) = \frac{1}{N_W} \sum_{j=1}^{N_W} S_j(R_k) \quad i = 1, 2, 3 \ldots N_P \quad (4)$$

where the index k depends on both indices i and j since:

$$k = i - \text{int}\left[\frac{(j-1)RSP}{\Delta R}\right]. \quad (5)$$

The symbol $N_w$ in Eq. (4) is the number of individual waveforms to be processed. In Eq. (5), ΔR represents the spacing between consecutive range vector elements $R_i$ (i.e., ΔR is the size of the range bins), while the function int[ ] denotes the nearest integer of the result of the expression enclosed in brackets. The above equation clearly shows that the range shift applied to any given waveform increases linearly with the rank j of the waveform in the whole set. For simplicity, the first waveform $S_1$ is left unchanged in the process detailed by Eq. (4), that is, k=i for j=1. This means that the reconstructed signature of a moving object will be located at the range the object was at the moment the rangefinder received the first waveform of the set, that is, at R=50 m in the present example. Note that for large values of RSP, the sum in Eq. (4) may need to be stopped before the index j attains its higher bound $N_w$ since the index k must always be positive.

Figure 6:
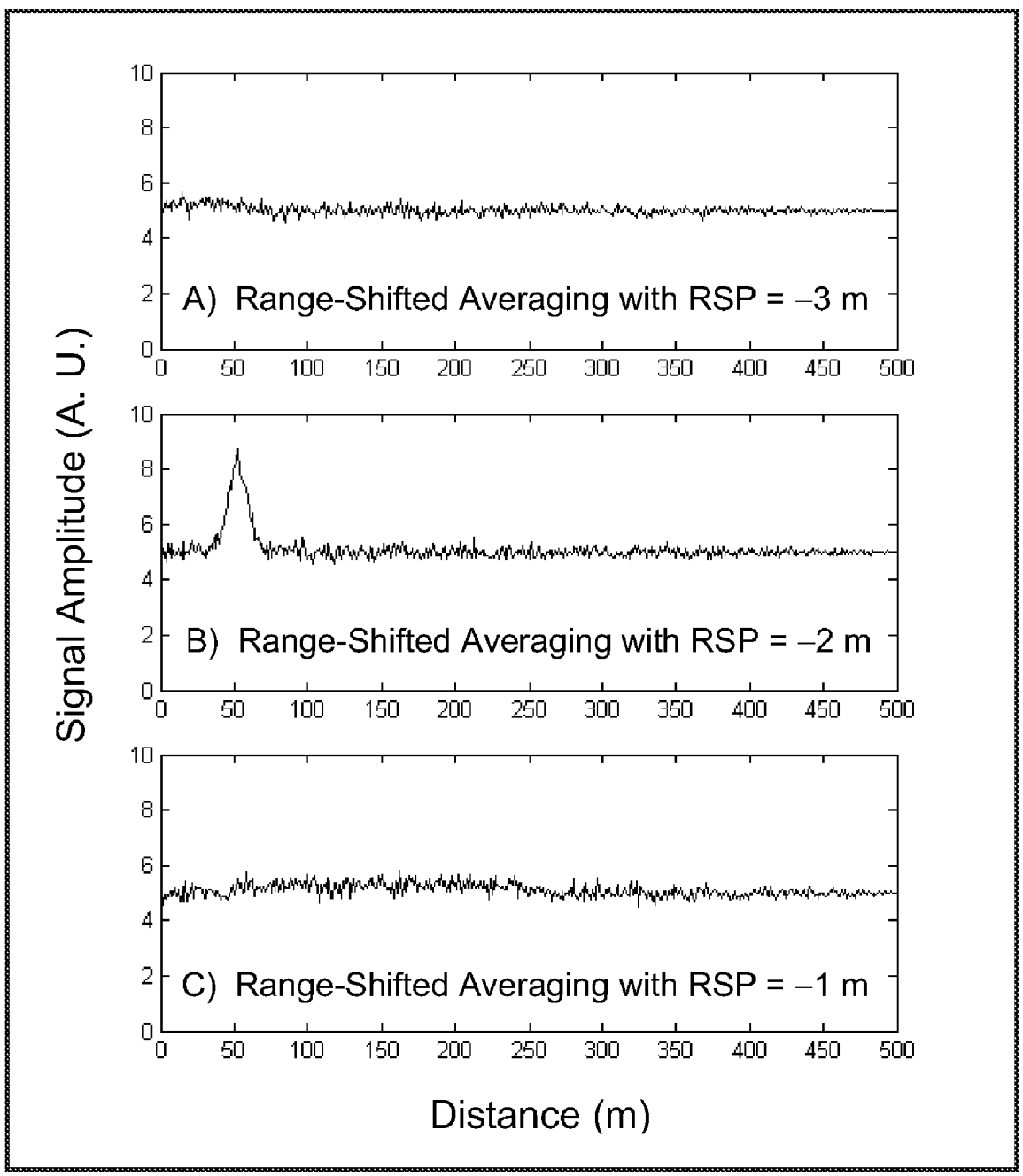
FIGS. 6A to 6C show the resulting waveforms obtained by averaging a set of 200 independent signal waveforms which have been previously shifted using three different values of the range shift parameter (RSP)

Using the same raw waveform set as in the example depicted in FIG. 5, the range-shift averaging process of the present invention has been conducted by sweeping the value of the range shift parameter RSP from −10 m to +10 m by steps of 1 m. FIGS. 6A to 6C display the resulting signal waveforms averaged by using the specific values RSP=−3 m, −2 m and −1 m, respectively. As previously mentioned, the object was moving so that the distance of the peak amplitude of the signal it returned to the rangefinder increased by ΔD=+2 m from waveform to waveform. As seen in FIG. 6B, the object signature is fully recovered by the averaging process when using the value RSP=−ΔD=−2 m. In fact, the waveform displayed in FIG. 6B is nearly identical to the one that would be obtained if the object would have been left stationary at the range R=50 m. For an object that moves at a constant velocity, the SNR-enhancing capability of the standard data averaging method is maintained when implementing the range-shifted averaging process of the present invention.

Figure 7:
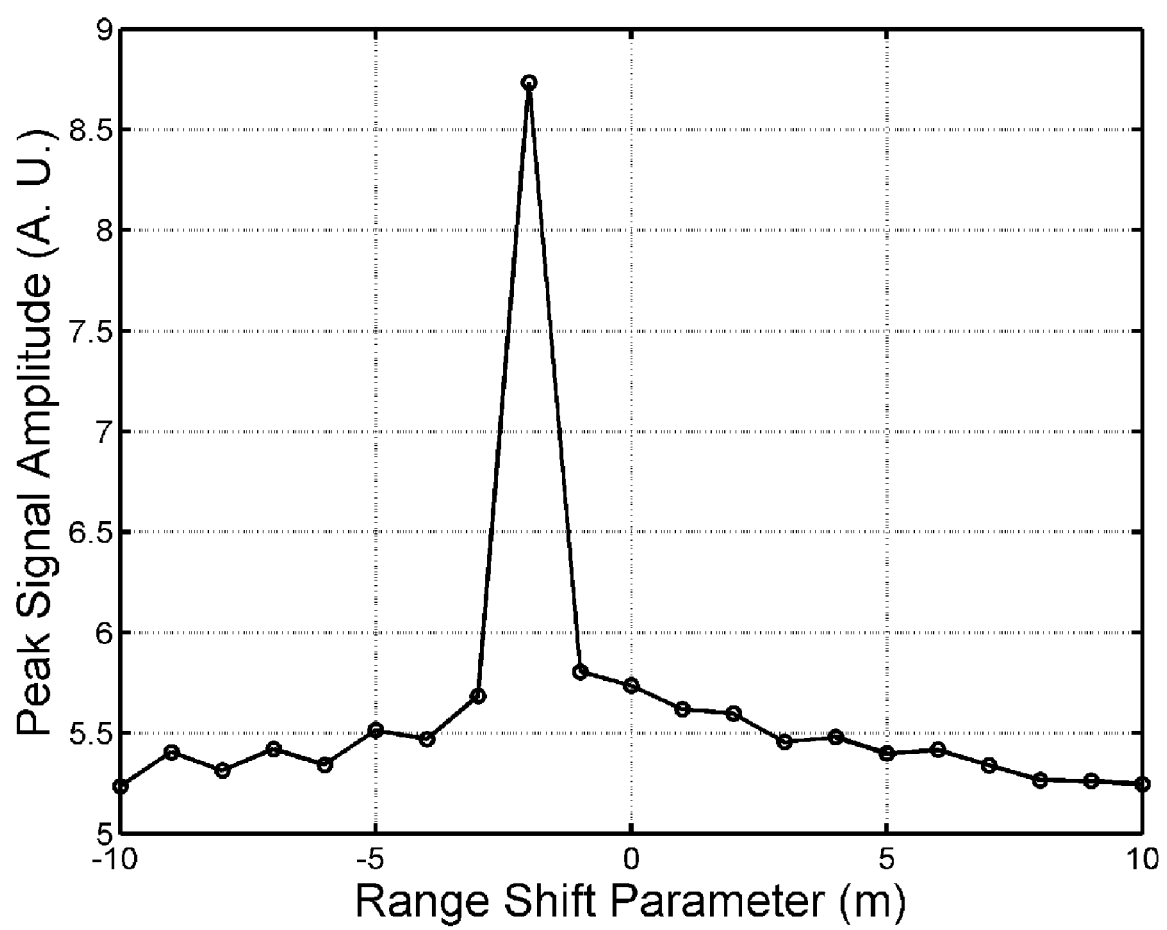
FIG. 7 plots the maximum amplitude of the waveform generated by averaging a range-shifted set of 200 independent signal waveforms, as a function of the incremental range shift parameter.

To gain more insight on the effect of the RSP on the range-shifted averaging process, the signal amplitude of the object signature detected in the resulting waveforms has been plotted in FIG. 7 for the whole interval over which the RSP was varied. The signal clearly stands out at the optimum value RSP=−2 m, thus making its detection very easy, as it was shown in the waveform illustrated in FIG. 6B. The signal amplitude plotted in FIG. 7 tends towards the background offset level (set to 5 in this example) as the RSP departs from the optimum value. Note that the averaging process of the present invention can also be used for ranging objects at rest, but in this situation the signal amplitude would peak for the specific value RSP=0 m.

Having found the optimum RSP, dividing its sign-reversed value by the time delay that separates two consecutive acquisitions of signal waveforms gives the velocity at which the object was moving along the line of sight of the rangefinder.

The extent of the interval over which the RSP is swept impacts heavily on the processing effort required for completing the range-shifted averaging process. Selecting a very wide interval is a safe approach that calls for a lot of computations, whereas the procedure would fail to recover the static object signature if the optimum RSP falls outside of an interval that is too narrow. Fortunately, an educated guess for setting the limits of this interval could be based on the reasonable maximum velocity expected for the class of moving objects to be ranged. Knowing the maximum object velocity to be measured by the instrument allows to readily determine the corresponding maximum range shift ΔD of the signal returned by the object for a given time delay between successive signal acquisitions. This time delay depends primarily on the pulse repetition frequency of the optical emitter module of the rangefinder. The RSP can then be varied over an interval that encloses, with safe margins, the expected maximum range shift.

As a practical example, we consider the implementation of the method in an optical rangefinder that forms part of a forward-looking collision-avoidance system installed in a vehicle. The maximum absolute speed of a vehicle to range could be set to 150 km/h. Assuming that the car in which the rangefinder is installed could move at the same maximum absolute speed, the relative travel speed of an obstacle that is moving towards the car would then not exceed 300 km/h, or 83 m/s. With a time delay of 1 ms between successive signal acquisitions, as would be obtained with a rangefinder emitting optical pulses at 1-kHz PRF, the object signature would be shifted by about −8 cm on consecutive waveforms. This range shift is smaller than the range bin size obtained when sampling with an A/D converter clocked at several tens of MS/s. As a result, dedicated numerical processing may be required to perform the range shifts of the signal waveforms.

The incremental step used in the search for the optimum value of the RSP impacts heavily on the precision with which the relative velocity of an object in motion can be measured. Obviously, using smaller increments could lead to more precise velocity measurements, but the number of range-shifted averaging operations to perform would increase accordingly. As shown in the curve of FIG. 7, the peak signal amplitude plotted as a function of the RSP has a unique and well-defined peak when the object is moving at a constant velocity. The precision at which the peak of the curve in FIG. 7 is located determines the precision of the velocity measurement. Instead of using a simple scan of the RSP over a selected interval, as described above, one skilled in the art could readily implement efficient algorithms that would allow better precision for locating the peak visible in FIG. 7.

Figure 8:
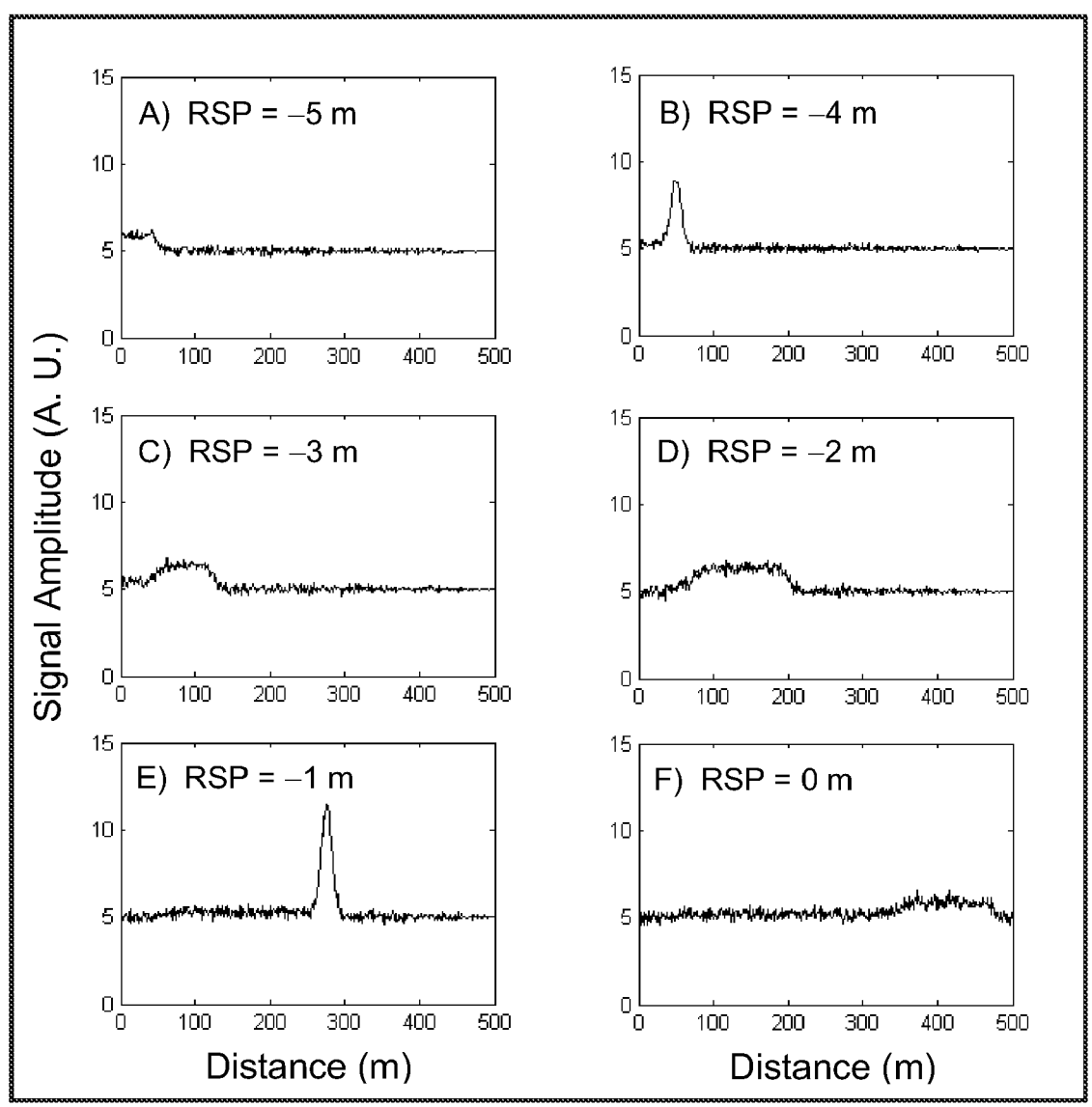
FIGS. 8A to 8F show some waveforms obtained from range-shifted averaging of a set of 200 independent signal waveforms returned from an object that moved at two different velocities during the integration period.
Figure 9:
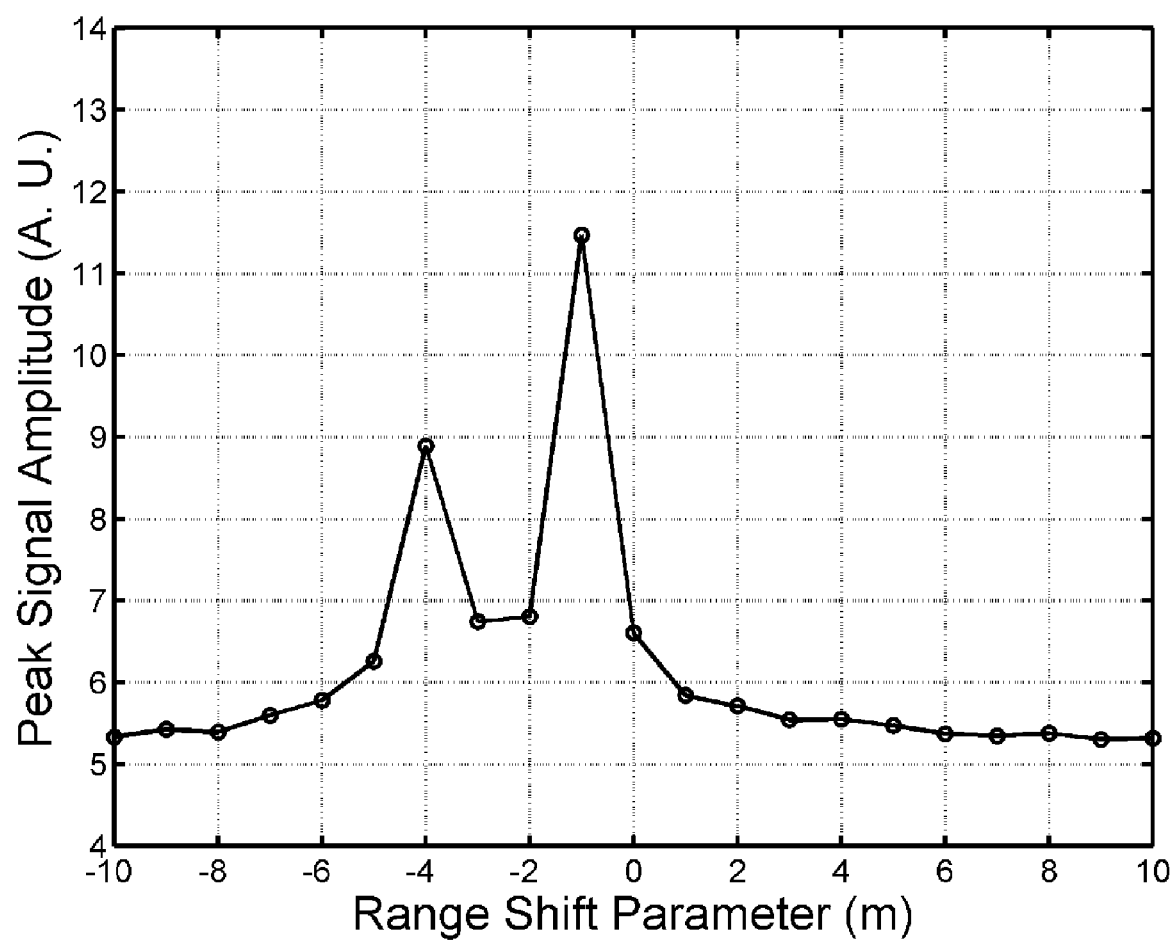
FIG. 9 plots the maximum amplitude of the waveform generated by averaging a range-shifted set of 200 independent signal waveforms returned from an object that moved at two different velocities during the integration period. The signal amplitude is plotted as a function of the incremental range shift parameter.

The scope of the range-shifted averaging process of the present invention is not limited to objects that move at a constant velocity. For instance, FIGS. 8A to 8F illustrate the signal waveforms obtained after having range shifted a set of 200 waveforms that simulated the ranging to an object that was moving from R=50 m to R=350 m at a first velocity $V_1$ and then moving at a lower velocity $V_2$ for R=350 m to R=475 m. The velocity $V_1$ resulted in an object signature that was displaced by $\Delta D_1$=+4 m on consecutive waveform acquisitions while the second velocity gave a range shift $\Delta D_2$=+1 m. As seen in the figures, the presence of well-defined signal peaks in the averaged signal waveforms is clearly detected for RSP values of −4 m (FIG. 8B) and −1 m (FIG. 8E). The maximum amplitude of the signal peaks relates to the number of waveforms acquired during each period the object was moving at a constant velocity. FIG. 9 shows the peak signal amplitude of the averaged waveforms plotted as a function of the RSP. The movement of the object at two different velocities is clearly guessed from a visual inspection of FIG. 9. In practice, the limited acceleration of the object when passing from the first velocity to the second one would lead to a broadening of the signal peaks visible in FIG. 9 while slightly decreasing their maximum amplitudes. Above all, the shape of the peak signal amplitude plotted as a function of the RSP gives useful information about the motion of an object that is ranged with a digital rangefinder that processes the signal waveforms according to the method described in this second embodiment of the invention.

Description of a Third Preferred Embodiment of the Invention

Averaging of Range-Shifted Signal Waveforms in Scanning Rangefinder Applications When used for the monitoring of aerial drifts of aerosol clouds or in collision-avoidance systems for vehicles, rangefinders often have their line of sight repeatedly scanned in an automatic fashion in order to cover a zone of interest. The maximum range covered by the rangefinder and both extreme angular deviations of its line of sight during the scans define the boundaries of the monitored zone. In both applications mentioned above, the object to be ranged is generally in motion relative to the rangefinder, so that the standard averaging of a set of returned signal waveforms cannot enhance the SNR. The situation becomes particularly dramatic when one attempts at ranging sparse aerosol clouds that return very weak pulse echoes. In collision-avoidance systems, any object located in front of the vehicle must be detected and ranged at distances far enough from the vehicle to allow the system to react in a timely manner to the presence of the object. In addition, the pulse echoes returned by a solid object such as a vehicle could be relatively weak when ranging under adverse weather or degraded visibility conditions. As a consequence, in both applications the successful ranging of objects in motion is generally not possible from a single signal waveform while the standard averaging of a set of waveforms is of little help. In a third preferred embodiment of the present invention, a method is described that allows significant improvements of the SNR response of scanning rangefinders used in applications such as those discussed above. The method can be thought of as an extension of the averaging of range-shifted waveforms received when ranging along a fixed line of sight, as previously described in the second preferred embodiment.

Figure 10:
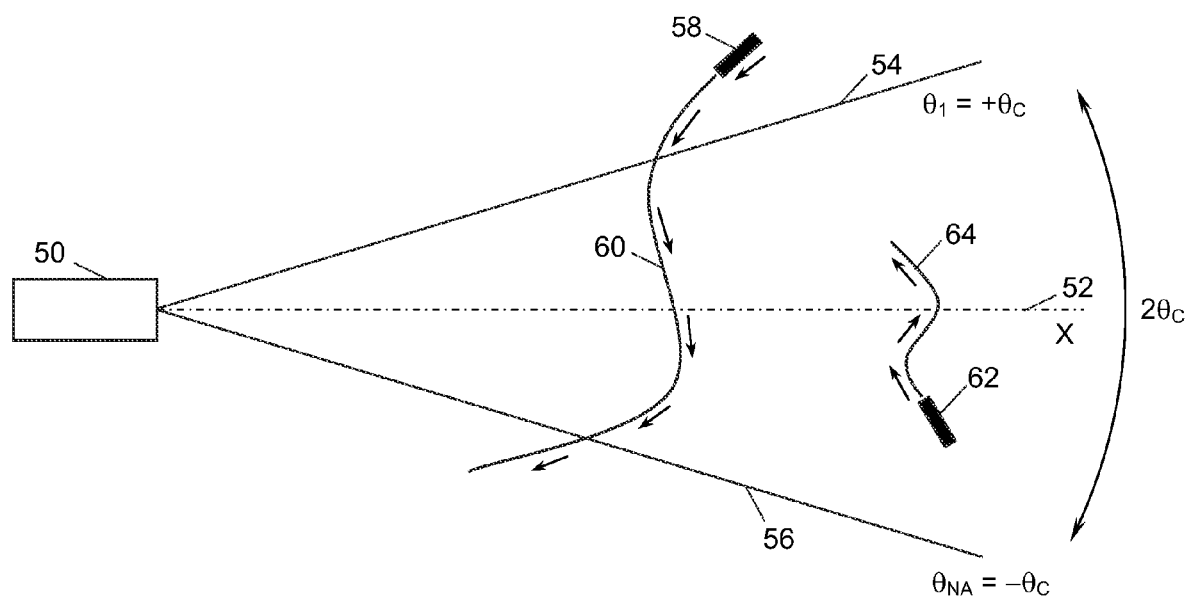
FIG. 10 is a schematic diagram of a rangefinder configuration with angular scan of the line of sight according to a third preferred embodiment of the invention.

The method of this third preferred embodiment finds its best use in applications that rely on a scanning rangefinder configuration such as the one illustrated in the schematic diagram of FIG. 10. In this configuration, the aiming direction of an optical rangefinder 50 is scanned over a zone of interest whose angular extent is defined by the fan-out angle $2\theta_C$. $\theta_C$ represents the maximum tilt angle of the aiming direction symmetrically on either side of the X axis 52 depicted in the figure. When the rangefinder 50 is in operation, its aiming direction is scanned repeatedly with an angular velocity $\omega$ (radians/s) from the initial direction 54 pointing at the angle $\theta$=+$\theta_C$ up to the final direction 56 pointing at $\theta$=−$\theta_C$. Each individual angular scan is temporarily stopped at a predetermined set of angles $\theta_i$, i=1 to NA to allow the firing of an optical pulse and the subsequent capture of a pulse echo possibly returned by an object that could intersect the optical beam. The rangefinder 50 is then operating preferably in the common "stare and shoot" regime. The specific angles $\theta_i$ at which signal waveforms are collected will be referred to as the lines of sight of the scanning rangefinder 50. For the sake of clarity, FIG. 10 shows only both outer lines of sight 54 and 56. NA stands for the number of lines of sight enclosed in the fan-out angle $2\theta_C$. The tilt angle $\theta_i$ of each discrete line of sight is measured with respect to the X axis 52 (set by convention to 0°), with the angle values being increasing when rotating counterclockwise. The lines of sight all lie in the same plane, which is set horizontally in most practical applications. The schematic diagram of FIG. 10 then shows a top view of the scanning rangefinder configuration. However, it must be understood that the angular scans can be performed in any other plane without departing from the scope of the present invention.

The filled rectangle 58 in FIG. 10 depicts an object in motion that crosses the outer line of sight 54 to enter in the zone monitored by the scanning rangefinder 50. The curved solid line 60 illustrates an example of a possible trajectory of the object 58 during its transit in the monitored zone. The object 58 is coming from the left for an observer standing at the position of the rangefinder 50 and facing the X axis 52. However, one can readily imagine that the object 58 may also come from the right. In the latter case it will first intersect the line of sight 56 that points along the angle $\theta_{NA}$=−$\theta_C$. Finally, the object 62 and its corresponding trajectory 64 depict another practical case of figure wherein the object to be detected and ranged is already present in the monitored zone when the rangefinder 50 starts its sequence of angular scans. This leads naturally to the more general situation where several objects could be present in the monitored zone while moving independently from each other.

In most practical situations, the object 58 does not travel along a straight-line path during its transit in the monitored zone since the magnitude V and direction $\theta_V$ of its velocity vector may change in an unpredictable fashion. The shape of its trajectory 60 clearly illustrates such a situation. In fact, there is no need to require that an object 58 be in regular motion in the entire zone defined by the fan-out angle $2\theta_C$ to use the method of the present invention. However, the operation of the method requires that the object 58 be moving with constant velocities (in both magnitude and direction) within a set of contiguous subregions of limited extents, each subregion enclosing a number of lines of sight. Stated otherwise, it is assumed that the trajectory 60 of the object 58 can be approximated as a succession of short straight-line paths, each path being travelled at a constant velocity.

Figure 11:
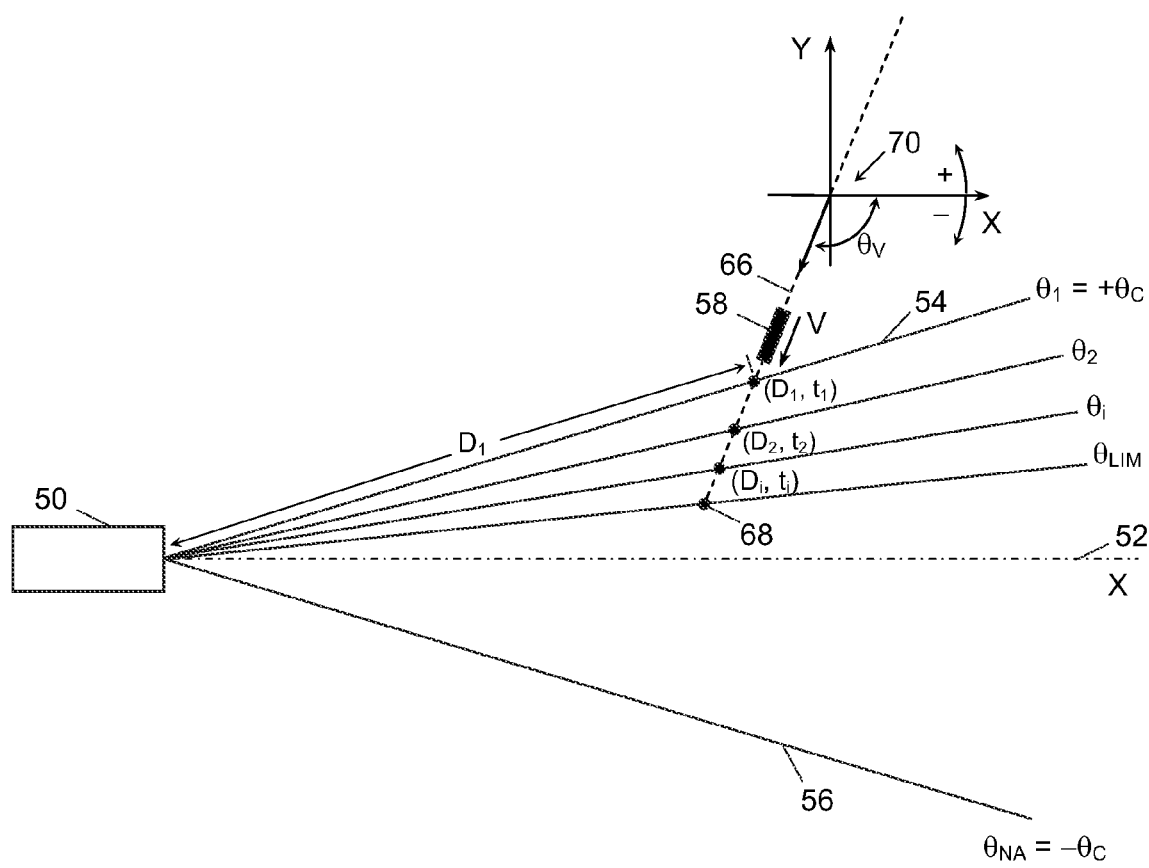
FIG. 11 is a schematic diagram showing the straight-line trajectory of an object moving at a constant velocity V during its transit in a subregion delimited by the lines of sight pointing at the angles $\theta_1$ and $\theta_{LIM}$.

The schematic diagram shown in FIG. 11 differs from that of FIG. 10 by the fact that it focuses on the straight-line trajectory 66 of the object 58 that moves at a constant velocity V during its passage in a first subregion. The specific subregion shown in the diagram encloses a subset of lines of sight starting from the outer line of sight at $\theta_1$=+$\theta_C$ and finishing at the line of sight that points along an angle $\theta_{NL}=\theta_{LIM}$. For clarity, the diagram shows only a few of these lines of sight and the size of the subregion has been exaggerated as compared to the size of the entire zone scanned by the rangefinder 50. NL represents the number of lines of sight enclosed in the subregion. This number depends on the angular extent of the subregion and on the incremental angular step between two consecutive lines of sight. As will be shown below, the enhancement of the SNR response of the rangefinder 50 scales as $(NL)^{1/2}$, so that NL should preferably be as high as possible. On the other hand, each subregion must be kept small enough not to invalidate the convenient assumption of an object travelling with a constant velocity vector. NL should not be confused with the number NA (NA>>NL) of lines of sight enclosed in the fan-out angle $2\theta_C$, as discussed previously. The filled dots 68 in FIG. 11 illustrate the places where the straight-line trajectory 66 of the object 58 intersects the various lines of sight that fall within the subregion.

The distance $D_i$ from the rangefinder 50 at which the object 58 intersects any given line of sight $\theta_i$ in the subregion depends solely on the values of the kinematic parameters V and $\theta_V$ of the object 58 and of the distance $D_1$ of its intersection with the first line of sight $\theta_1$. Using the symbol $t_i$ to describe the time at which the object 58 intersects any given line of sight $\theta_i$, the regular motion of the object 58 along the straight-line trajectory 66 causes the quantities $D_i$ and $t_i$ to be related to the kinematic parameters of the object through the formulas:

$$D_i = D_{REF}\left(\frac{\sin(\theta_{REF} - \theta_V)}{\sin(\theta_i - \theta_V)}\right) \text{ and } t_i = \frac{D_{REF}}{V}\left(\frac{\sin(\theta_{REF} - \theta_i)}{\sin(\theta_i - \theta_V)}\right) + t_{REF} \quad (6)$$

The subscript REF means that the corresponding parameters pertain to a reference line of sight, which is given by the line of sight pointing at the angle $\theta_1 = +\theta_C$ for the specific subregion shown in FIG. 11. We have employed the subscript REF to stress the fact that the application of Eq. (6) is not limited to the sole subregion shown in FIG. 11. Hence, the reference line of sight associated to any other subregion would be given by the first line of sight the object 58 would cross. Both kinematic parameters V and $\theta_V$ are defined with respect to the X-Y reference frame 70 of the rangefinder 50, which could be moving as well. V and $\theta_V$ must then be understood as the relative velocity and relative direction of travel of the object 58, respectively, during its transit in the subregion depicted in the figure.

As mentioned earlier, the purpose of this third preferred embodiment of the invention is to enable a scanning rangefinder 50 to detect and range moving objects 58 by increasing the SNR of the resulting signal waveforms via dedicated numerical processing that involves range shift operations. The method consists in range shifting raw signal waveforms received for a set of lines of sight comprised in a given subregion. To allow the ranging of the object as soon as it enters in the monitored zone, it is preferable to perform the method in a first step by processing only the signal waveforms acquired as the rangefinder was pointing in the subregion shown in FIG. 11, which is delimited on one side by the outer line of sight 54 at $\theta_1 = +\theta_C$. The method would then be applied in a second step for the opposite subregion, i.e., the subregion bounded on one side by the outer line of sight 56. This second step is to allow the early detection of an object 58 that could come from the right-hand side of the rangefinder 50. Having "scanned" both subregions contiguous to the outer lines of sight 54 and 56, the next steps of the procedure would consist in applying the method for a set of contiguous subregions in order to cover progressively the entire zone to be monitored. For the sake of simplicity, the following description of the method will be mostly focused on the specific subregion shown in FIG. 11, but it should be noted that the method applies to the other subregions as well.

The object signature present in a signal waveform acquired as the rangefinder 50 was pointing along a line of sight $\theta_i$ will be shifted by the quantity $\Delta D_i = D_i - D_1$ relative to the same signature present in the waveform received at the reference line of sight 54. The distance $D_i$ can be predicted from Eq. (6) since the object is assumed to be moving at a constant velocity in the subregion. Performing a range shift by the amount $-\Delta D_i$ for the waveform and then repeating for each line of sight will give a set of NL waveforms (one for each line of sight) that could then be averaged in order to increase the final SNR by a factor of nearly $(N_L)^{1/2}$. An important aspect of the method is that the range shifts must be performed without any a priori knowledge of the real kinematic parameters V and $\theta_V$ of the object 58 during its travel in the subregion. The distance $D_1$ and moment $t_1$ at which it crossed the reference line of sight 54 are not known as well. It must be recalled in this purpose that the present method finds its best use in situations where the object signature that could be present in the signal waveforms is embedded in noise. It must also be noted that several waveforms have been acquired for each line of sight comprised in the subregion, due to the fact that several angular scans have been completed prior to the start of the numerical processing of the waveforms. Assuming that the object 58 crossed the subregion during the time required to perform the angular scans, only a few waveforms (and possibly a single one) could contain a signal indicative of the presence of the object 58 for each line of sight. In most practical applications, the motion of any object of interest to be ranged is slow compared to the scanning velocity of the rangefinder 50. It can therefore be assumed that at least one waveform comprising a signature of the object 58 can be recorded for each line of sight enclosed in the subregion. Similarly to the method described in the second embodiment of the invention, the value of (at least) one parameter describing the motion of the object 58 will need to be varied over a prescribed interval in order to find the optimum value of this parameter from the result of the averaging of the range-shifted waveforms. In the present context, the values of the four parameters V, $\theta_V$, $D_1$ and $t_1$ governing the regular motion of the object 58 in the subregion will need to be varied simultaneously within their specific intervals for searching the optimum combination that would lead to a reconstructed waveform that maximizes its SNR. The basic steps of the procedure can be detailed in the following manner:

1. Program the rangefinder to perform several angular scans over the full fan-out angle $2\theta_C$ to acquire a set of signal waveforms $S(R_i, \theta=\theta_j, t=t_{j,k})$ during a given time period and for a set of discrete lines of sight $\theta_j$. Store the waveforms into memory. The moment at which the first angular scan is started sets the origin of the time count.
2. Gather the signal waveforms acquired for the lines of sight comprised within a first subregion bounded on one side by the reference line of sight at the angle $\theta_1=+\theta_C$. This is the subregion shown in FIG. 11. In other words, gather only the lines of sight $\theta_j$ with $\theta_{LIM} \leq \theta_j \leq \theta_1$ to allow early detection of an object coming possibly from the left-hand side of the rangefinder.
3. Set the boundaries of the intervals over which the parameters V, $\theta_V$, $D_1$ and $t_1$ governing the regular motion of the object 58 will be varied as well as the incremental steps of the parameters.

4. Using Eq. (6), predict for a first combination (V, $\theta_V$, $D_1$, $t_1$) the time $t_j$ at which the object should have intersected the line of sight $\theta_j$. Retrieve from memory the signal waveform $S(R_i, \theta_j, t_{j,k})$ whose specific acquisition time $t_{j,k}$ is the closest to the predicted time of intersection $t_j$. Repeat the present step for each line of sight $\theta_j$ enclosed in the subregion.

5. Using Eq. (6), compute the quantity $\Delta D_j = D_j - D_1$ and then perform a range shift of the retrieved signal waveform $S(R_i, \theta_j, t_{j,k} \approx t_j)$ by the amount $-\Delta D_j$. Repeat the present step for all of the signal waveforms retrieved in step 4.

6. Compute the average of the signal waveforms that have been range shifted in the preceding step. Record the peak signal amplitude of the resulting signal waveform and its corresponding range R.

7. Repeat Step 4 through Step 6 for each combination (V, $\theta_V$, $D_1$, $t_1$). The number of combinations to be tested is given by $N_V \times N_\theta \times N_D \times N_T$ where $N_V$, $N_\theta$, $N_D$ and $N_T$ are the numbers of incremental steps for variation of the four parameters.

8. From the whole set of peak signal amplitudes obtained in Step 7, identify the one at which the amplitude gets maximum. Record the corresponding optimum combination (V, $\theta_V$, $D_1$, $t_1$)$_{OPT}$ that was used to get the corresponding signal waveform.

9. The ranging operation is considered successful if the maximum signal amplitude found in Step 8 exceeds a preset detection threshold.

10. If no object has been successfully ranged in Step 9, repeat Step 2 through Step 9 for a subregion contiguous to the reference line of sight tilted at the opposite angle $\theta_{NA} = -\theta_C$, and retrieve the signal waveforms acquired for the lines of sight $\theta_j$ enclosed in this subregion. Replace $D_1$ by $D_{NA}$ and $t_1$ by $t_{NA}$ as well, to reflect the change of the reference line of sight. This step is to allow the early detection of an object coming possibly from the right-hand side of the rangefinder.

11. Upon successful ranging of an object, the optimum combination (V, $\theta_V$, $D_1$, $t_1$)$_{OPT}$ or (V, $\theta_V$, $D_{NA}$, $t_{NA}$)$_{OPT}$ gives directly the real kinematic parameters of the object during its transit in the subregion. Application-specific actions can then be undertaken, such as the display of the signal waveform obtained from the optimum combination, the display of the object kinematic parameters, the conduction of a hazard assessment from the predicted trajectory of the object, etc. . . .

The procedure steps listed above are intended for the ranging in real time of a moving object 58 as soon as it enters from either side in the zone monitored by a rangefinder 50. This is the reason why the range shift operations are performed on the signal waveforms acquired for both specific subregions contiguous to the outer lines of sight 54 and 56 shown in FIGS. 10 and 11. Depending on the needs of the specific application, Steps 1 through 9 listed above could be repeated for the other subregions enclosed in the full fan-out angle $2\theta_C$, each subregion having its own reference line of sight. The procedure then remains basically the same, except for the fact that the four intervals for generating each combination (V, $\theta_V$, D, t) can be made narrower than for both outer subregions, and they can be centered on the optimum values previously determined. Note, however, that the specific intervals for both parameters V and $\theta_V$ must be kept wide enough to allow sufficient room for dealing with any change in the kinematic parameters of the object 58 during its transit in the zone covered by the rangefinder 50.

The need for keeping the intervals of variation of the parameters V, $\theta_V$, D and t wide enough becomes more evident when considering situations where more than one object could be simultaneously present in any subregion in which the method is applied. More than one optimum combination (V, $\theta_V$, D, t)$_{OPT}$ would be found in this situation, but the corresponding peak signal amplitudes will generally not be the same. Fortunately, this situation can be easily tackled by performing the range shift procedure steps detailed above simultaneously for each object, so that the objects could be ranged individually in real time.

Performing the range shift process for the inner subregions enclosed in the full fan-out angle $2\theta_C$ enables the timely detection and ranging of objects that enter in the monitored zone without intersecting any of the outer lines of sight 54 or 56. For a collision-avoidance system mounted in a vehicle, one can easily imagine that a remote vehicle that moves along a direction nearly parallel to the X axis 52 in FIG. 10 could be approaching the rangefinder from the front. Likewise, a scanning rangefinder used for ranging clouds of aerosols must be able to detect clouds that appear suddenly in the interior of a monitored zone. A representative example could be given by a scanning rangefinder that ranges the aerial drifts of smoke plumes exhausted from a set of chimneys located at different places in a zone covered by the angular scans.

While the preferred embodiments of the invention in their various aspects have been described above, such descriptions are to be taken as illustrative of embodiments of the invention rather than descriptions of the intended scope of the invention, which scope is more fully appreciated by reference to the disclosure as a whole and to the claims that follow.

The invention claimed is:

1. An apparatus for optically sensing a remote object, said apparatus comprising:
   an optical emitter module for sending optical pulses towards said object;
   an optical receiver module for receiving optical signals reflected by said object and for converting said optical signals into digital signal waveforms; and
   a control and processing unit for processing said digital signal waveforms, said control and processing unit being adapted to:
   (a) sample said digital signal waveforms at a predetermined number $N_p$ of range values $R_i$, $i = 1, 2, 3, \ldots, N_p$;
   (b) select a function $N(R_i)$ that gives the number of data samples to be averaged for each range value $R_i$;
   (c) compute the average of a quantity $N(R_i)$ of signal data sampled at a first range value $R_i$ each time a quantity $N(R_i)$ of signal waveforms has been generated;
   (d) update an average signal amplitude previously measured at said range $R_i$ with the result computed above; and repeating step (c) for each range value $R_i$,
   whereby the response time of said apparatus is minimized for each range $R_i$ by averaging only the quantity $N(R_i)$ of data sampled at each range $R_i$ that is required to get a desired signal to noise ratio at each range $R_i$.

2. An apparatus according to claim 1, comprising a laser rangefinder.

3. An apparatus according to claim 1, comprising a lidar.

4. An apparatus according to claim 1, said optical emitter module comprising at least one light-emitting diode.

5. An apparatus according to claim 1, wherein said function $N(R_i)$ increases monotonically with said range value $R_i$.

6. An apparatus according to claim 1 wherein said function $N(R_i)$ is given by a polynomial expression of order comprised in the interval of 1 to 4.

7. An apparatus according to claim 1, wherein said function $N(R_i)$ is given by the square of the ratio between a desired value for the signal to noise ratio of the processed signal waveforms and the real signal to noise ratio measured at each range value $R_i$ for a single raw signal waveform.

8. A method for optically sensing a remote object using an optical sensing apparatus, comprising the steps of:
   (a) sending optical pulses towards said object,
   (b) receiving the optical signals reflected by said object,
   (c) converting said optical signals into digital signal waveforms, each of the said digital signal waveforms being formed of data sampled at a predetermined number $N_p$ of range values $R_i$, i=1, 2, 3,..., $N_p$, and
   (d) numerically processing said digital signal waveforms, said numerically processing step comprising:
      (d1) selecting a function $N(R_i)$ that gives the number of data samples to be averaged for each said range value $R_i$,
      (d2) computing the average of a quantity $N(R_i)$ of signal data sampled at a first range value $R_i$ each time a quantity $N(R_i)$ of signal waveforms has been generated,
      (d3) updating an average signal amplitude previously measured at said range $R_i$ with the result computed in step (d2),
      (d4) repeating steps (d2) and (d3) for each said range value $R_i$,
   wherein the response time of said apparatus is minimized for each said range $R_i$ by averaging only the quantity $N(R_i)$ of data sampled at each said range $R_i$ that is required to get a desired signal to noise ratio at each said range $R_i$.

9. A method according to claim 8 wherein said optical sensing apparatus comprises a laser rangefinder.

10. A method according to claim 8 wherein said optical sensing apparatus comprises a lidar.

11. A method according to claim 8 wherein said optical sensing apparatus uses at least one light-emitting diode for sending optical pulses towards said object.

12. A method according to claim 8 wherein said function $N(R_i)$ increases monotonically with said range value $R_i$.

13. A method according to claim 8 wherein said function $N(R_i)$ is given by a polynomial expression of order comprised in the interval of 1 to 4.

14. A method according to claim 8 wherein said function $N(R_i)$ is given by the square of the ratio between a desired value for the signal to noise ratio of the processed signal waveforms and the real signal to noise ratio measured at each range value $R_i$ for a single raw signal waveform.

* * * * *